S. A. BRACKETT & W. W. WHITCOMB.

Seam for Boots, &c.

No. 6,277. Reissued Feb. 9, 1875.

Witnesses:
J. M. Keith
J. W. Keith

Inventor:
Saml A. Brackett
William W. Whitcomb

THE GRAPHIC CO. PHOTO-LITH. 39 & 41 PARK PLACE, N.Y.

UNITED STATES PATENT OFFICE.

SAMUEL A. BRACKETT AND WILLIAM W. WHITCOMB, OF BOSTON, MASS., ASSIGNORS TO THE UNION PATENT SEAM COMPANY, OF HARTFORD, CONNECTICUT.

IMPROVEMENT IN SEAMS FOR BOOTS, &c.

Specification forming part of Letters Patent No. 133,826, dated December 10, 1872; reissue No. 5,391, dated May 6, 1873; reissue No. 6,277, dated February 9, 1875; application filed December 21, 1874.

*To all whom it may concern:*

Be it known that we, SAMUEL A. BRACKETT and WILLIAM W. WHITCOMB, both of Boston, in the Commonwealth of Massachusetts, have invented a certain Improvement in the Manufacture of Boots and Shoes, of which the following is a specification:

Our invention relates to the method of forming the seams in sewing together the parts composing the uppers of boots and shoes; and consists in stitching together from the outside the two parts to be joined, with or without an interposed welt, in such manner that the edge of the one part shall extend so far beyond the line of stitching that it may be turned over the edge of the other part and again stitched beyond the edge thus covered to the main body of such other part. The edge thus covered over raises a ridge between the two lines of stitching, that serves to protect the stitches from attrition in wear, and this ridge may be made more prominent by inserting a small cord under the edge, to be turned over before it is sewed down. When, however, the leather is thick enough, the ridge will have sufficient prominence without the use of such cord. Preferably, the edge to be turned over and sewed down over and beyond the other edge, is made to extend farther beyond the first line of stitching than the other edge; but when this is not the case, the edge to be covered must be rolled or folded back, so that the other edge can be lapped entirely over, and sewed down beyond it.

Our invention is applicable to the joining together of the parts of a boot-leg, and other parts of the uppers of boots and shoes; and the objects of our invention are to make a durable union of the parts with only two lines of stitching, to save turning the boot-leg when completed, and to protect the seam-threads from attrition in wear.

Figure 1:
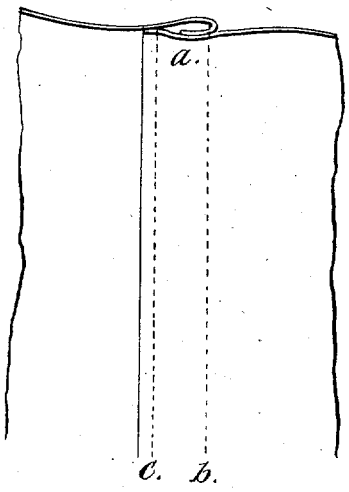
Figure 2:
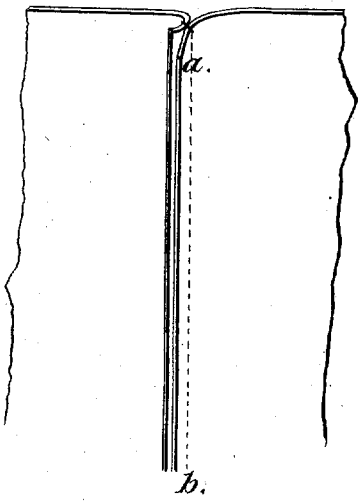
Figure 3:
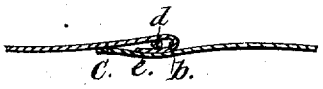

Figure 1 shows two pieces of leather with their inside surfaces placed together in proper position, and united by stitching them through and through, with the overlapping edge *a* of one piece stitched down over and beyond the edge of the other. *b* is the first, and *c* the second, line of stitching. Fig. 2 shows the same before the overlapping edge has been stitched down. Fig. 3 is a sectional view, with the overlapping edge *a* stitched down, and the small cord *d* inserted, to make more prominent the ridge *e*, between the lines of stitches.

We claim as our invention—

In the uppers of boots or shoes, the seam formed by stitching together from the outside the two parts to be joined, and then turning the edge of the one part over and stitching it down beyond the edge, and to the main body of the other part, substantially as and for the purposes hereinbefore described.

SAML. A. BRACKETT.
WILLIAM W. WHITCOMB.

In presence of—
J. M. KEITH,
J. W. KEITH.